Nov. 22, 1938.       H. SALVATORI       2,137,985
SEISMIC WELL LOGGING
Filed July 9, 1937
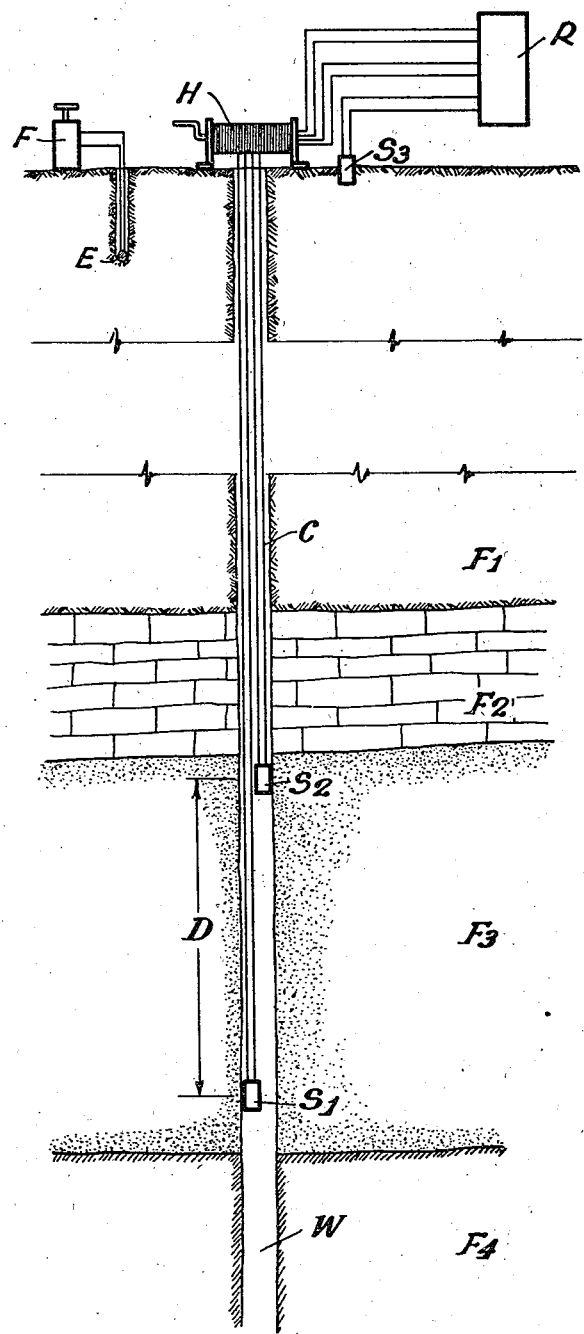
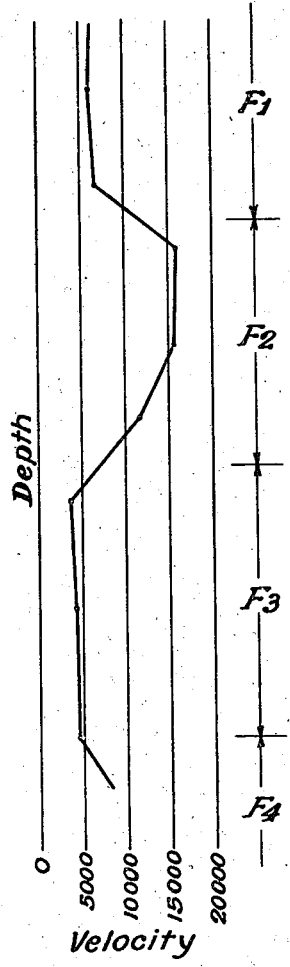
INVENTOR
Henry Salvatori
BY
ATTORNEY Patented Nov. 22, 1938

2,137,985

UNITED STATES PATENT OFFICE 2,137,985

SEISMIC WELL LOGGING

Henry Salvatori, Hollywood, Calif., assignor, by mesne assignments, to Stanolind Oil and Gas Company, Tulsa, Okla., a corporation of Delaware Application July 9, 1937, Serial No. 152,748

6 Claims. (Cl. 181—0.5)

This invention pertains to the art of geophysical prospecting, especially as applied to the study of various formations encountered in a well drilled into the earth. Specifically this invention deals with a method of continuous or intermittent determination of physical constants of the formations by seismic investigation.

In drilling wells for petroleum, gas or other minerals it is of utmost importance to obtain as much information as possible with regard to the beds traversed by the bore hole This information is essential in order to determine the position of the oil sand as well as to correlate the stratigraphic position of the well with respect to other wells in the region. In the past, the two major sources of information were core drilling and so-called "electrical coring". In the first method actual specimens of the various beds are obtained, while in the latter method the electrical properties of the formations are determined. However, core drilling is expensive and slow, and while electrical coring is much more rapid, the indications are of the electrical rather than lithological character of the structure. It is often difficult to correlate electric well logs from wells in the same territory, so that any additional means of correlation is valuable.

It is an object of my invention to provide improved methods for logging wells by the use of seismic waves. Another object of my invention is to provide improved methods for determining the velocity of travel of seismic waves in individual sub-surface strata or beds. Other and more detailed objects of my invention will become apparent as the description thereof proceeds.

The method outlined below requires no coring and gives an indication of the physical constants of the formations encountered. The quantity determined is the velocity of seismic waves through the formation being investigated, which is determined with high precision as a function of the depth of the formation. As is well known, the velocity of seismic waves through formations varies according to the type of material encountered. Thus, the compressional wave velocity through water is around 4500 feet per second, while in certain types of limestones the velocity is about 16,000 feet per second. By plotting the seismic wave velocity against depth, the abrupt changes which occur when the lithologic character of the beds changes will be apparent, and by a knowledge of the ranges of velocities found for various types of rock, etc., the kind of material encountered can be determined. Thus "markers" cannot only be identified from one well to another, but even their compositions can be inferred from their velocities.

The apparatus used in making a seismic well log can be best explained by reference to the accompanying figures, which form a part of the specification and are to be read in connection with it. In these figures similar reference numerals refer to the same or corresponding parts.

Figure 1 shows a diagrammatic cross section of a portion of the crust of the earth, taken through a well, and shows a preferred form of the apparatus used in making the well log.

Figure 2 shows the type of well log obtained from the setup used in Figure 1.

In Figure 1 a well W has been drilled from the surface through formations such as $F_1$, $F_2$, $F_3$, etc. Two seismometers or seismic wave detectors $S_1$ and $S_2$ have been lowered into the well by hoist H and are separated vertically by the distance D. These seismometers generate electrical waves as a result of motion of the instruments and can be of any known type. A third (optional) seismometer $S_3$ is placed adjacent the well head. A charge of explosive E is placed in a shallow well or on the surface of the ground close to the well head, and detonated by firing box F. This explosion sets up seismic waves which propagate in all directions. The initial waves actuating seismometers $S_1$ and $S_2$ are compressional waves traveling down the formations in a direction essentially parallel to the well. The responses of seismometers $S_1$, $S_2$, and $S_3$ are recorded in recorder R, which contains an amplifier for each seismometer and a multi-element oscillograph. By this means the responses of the instruments can be obtained in the form of traces on a photographic film, in a manner well known in the art. Simultaneously with the recording of the responses, timing intervals are printed on the record, so that the time elapsing between the instants the seismic wave reaches $S_2$ and $S_1$ can be obtained accurately and directly. In other words, the differential time of arrival is recorded. The average velocity between $S_2$ and $S_1$ can be found from $$V = \frac{D}{\Delta t}$$

where $\Delta t$ is the time between initial responses at the two seismometers. This velocity is plotted against the depth to the mid-point between the two seismometers, as shown in Figure 2. When a new formation is encountered, it is indicated by a change of the velocity, as in Figure 2 which shows velocities plotted against depth. From this figure it is evident that the different beds can be recognized from the differences in velocity, their compositions inferred from the known values for certain materials, and their depths, of course, established from the depths of the instruments.

The depth of the instruments can be obtained in two ways. The simplest and most accurate way is to use a calibrated hoist reel H for the cable or cables so that the precise depth is known at all times. A second, less accurate way is to compute the average velocity from the surface to the instruments (obtained from previous shots in the well) and multiply this by the time interval between the initial responses of seismometers $S_1$ and $S_3$. This method requires that the average velocity be known from the surface to the point of operation, so that the well log must be started from the surface, and cannot be used with accuracy if the survey starts a considerable distance down the well.

The accuracy of the survey depends upon the distance D and the accuracy with which $\Delta t$ can be read. D is in general kept less than the thickness of the least major bed encountered, and the film speed of the recorder is made sufficient to enable $\Delta t$ to be determined to at least 0.001 and preferably 0.0005 second. With this arrangement, precision can be obtained in delineating the markers. Practically, 50 to 100 feet has been found optimum for the distance D. Distances of from 20 to 200 feet can, however, be used under various conditions.

This method is well adapted to rapid logging operations. For example, the cable can be lowered slowly into the well, and an intermittent source of seismic waves, such as a pile driver, can be used. The depth of the initial logging point is measured on the cable, after which the additional depth is either measured on the hoist reel, or is calculated from the time interval between initial responses of seismometers $S_1$ and $S_3$, as previously outlined. This method of determining depth is superior to keeping a running log of the cable depth against time because an indication proportional to the cable depth is printed on each record, so that no correlation between records and a running log is required.

In this method of determining the change of velocity with depth, the distance to the surface and the instant of detonation of the charge are not used in the computations. This is of extreme importance. Previously a much cruder method was used to measure the average variation of velocity with depth. A single seismometer was lowered to various depths, a charge was detonated a known distance above or below the instrument, and the average velocity over that distance was computed. This method was obviously open to gross errors, since the travel time had to be obtained with an accuracy of 0.001 second in a total time of around one second. Any error in picking the time break, or a time difference between time break and actual initiation of the wave, due to conditions of the shot hole, etc., throws off the result. Such a method is inherently unsuited to seismic logging and has never been used for such a purpose to my knowledge. In my method only the differential time between initial response of the well seismometers is required, which can be very precisely determined.

A greater length of well can be logged per shot by using a considerable number of seismometers spaced at equal intervals, rather than just two. I prefer to use six spaced 50 feet apart, so that 250 feet of well can be surveyed per shot. Greater accuracy can be obtained by lowering the assemblage half the seismometer spacing between shots, so that a velocity determination is made every 25 feet. The assemblage can, of course, be raised progressively instead of being lowered progressively and the amount of movement between determinations can be some fraction of the seismometer spacing other than one-half.

Modifications of my method and apparatus will be apparent to those skilled in the art. There is no intention to limit my invention to the preferred embodiments shown and described but only to the scope of the appended claims which should be construed as broadly as the prior art will permit.

I claim:

1. A method of logging a well by means of seismic waves comprising disposing a group of at least two vertically spaced seismic wave detectors in a well, the spacing between adjacent detectors being not substantially greater than the thickness of individual major geologic beds traversed by said well, generating seismic waves at a point substantially vertically aligned with said detectors, recording the times of arrival of seismic waves at each of said detectors on a common record in a single operation, determining the differences between said arrival times and preparing therefrom a seismic log of said well yielding information concerning abrupt changes in the lithologic character of the geologic formations opposite said detectors.

2. A method according to claim 1 in which adjacent detectors in said group are spaced from about 20 to about 200 feet apart.

3. A method of logging a well by means of seismic waves comprising disposing a group of at least two seismic wave detectors in a well, adjacent detectors in said group being spaced from about 20 to about 200 feet apart, generating seismic waves at a point above said detectors and substantially vertically aligned with said detectors and recording the arrival times of seismic waves at said detectors on a photosensitized surface moving at such speed as to permit the determination of the differences between said arrival times to within about 0.0005 second and determining from said arrival times the differential seismic wave travel times between adjacent detectors in said group whereby information concerning abrupt changes in the lithologic character of the geologic formations opposite said detectors can be determined.

4. A method of logging a well by means of seismic waves comprising disposing a group of at least two vertically spaced seismic wave detectors in a well, moving said group of detectors vertically within said well without substantially changing the spacing between individual detectors in said group, and for each of a plurality of positions of said group of detectors, generating seismic waves at a point at least approximately vertically aligned with said detectors and recording in a single operation on a single record the times of arrival of said seismic waves at each of said detectors for each of said positions of said group of detectors and measuring the differences between arrival times of the same seismic waves at the various detectors of said group whereby information concerning abrupt changes in the lithologic character of the geologic formations opposite said detectors can be determined.

5. A method according to claim 4 in which said group of detectors is moved vertically between successive determinations a distance which is a fraction of the spacing between adjacent detectors in said group.

6. A method according to claim 4 in which said group of detectors is moved vertically between successive determinations a distance approximately half the spacing between adjacent detectors in said group.

HENRY SALVATORI.